United States Patent Office 3,737,325
Patented June 5, 1973

3,737,325
PREPARATION OF WINE AND CHEESE
FROM MILK
Emmet R. Engel, Oakland, Calif.
(Casa de San Jose, Box 90 SRA, Palmer, Alaska 99645)
No Drawing. Filed July 15, 1970, Ser. No. 55,284
Int. Cl. C12g 1/00; A23c 19/02
U.S. Cl. 99—35                    12 Claims

ABSTRACT OF THE DISCLOSURE

A milk fermentation process and the products formed thereby which constitute milk-wine cheese and milk wine, the former being a food product and the latter an alcoholic beverage. The milk-wine cheese comprises two components which may be separately collected, one of which is milk-wine top cheese and the other milk-wine bottom cheese or residuum. The process includes the steps of adding a fermentation culture and sugar to a quantity of separated fresh milk to initiate fermentation thereof which is then continued to completion in about 111 days. The process is essentially self-sustaining and produces concurrently in the same tank both milk-wine cheese and milk wine each of which can be aged and cured as it is produced.

---

This invention relates to a milk fermentation process and to fermentation products formed thereby, and it relates more particularly to a method of making "milk-wine cheese" and "milk wine" concurrently by fermenting milk within a tank or container therefor.

Cheese making is one of the oldest arts of mankind, and the traditional process by which cheese is made (generally summarized in over-simplified terms), constitutes collecting a mass or body of milk within a large vat or container used for this purpose, and then curdling the milk solids in the mass by adding rennet thereto (rennet being the stomach lining of young calves). Thereafter, the whey or liquid component of the milk mass is drained from the curds to permit drying thereof, but since curdling tends to occur at about the same time throughout the entire milk mass within the vat, it is first necessary to cut or segment the curdled mass in order to permit the whey otherwise trapped therein to drain therefrom.

The dried curd may then be salted and otherwise flavored and used almost immediately as "cottage cheese," or it may be pressed into blocks and cured, as in a salt brine, and aged until it attains the degree of sharpness or mellowness of taste desired. Generally, the longer cheese is aged the more mellow it becomes, although the particular flavor or taste of any cheese will depend to a considerable extent upon the type of milk used in the cheese-making process. That is to say, cheese can be made from the milk of substantially any animal and typical examples thereof are the milks of cows, goats, sheep and reindeer; and in addition to milk (and any cheese made therefrom) having a taste characteristic determined by the animal from which it is taken, the diet of the animal will also affect the taste of its milk product.

Whereas cheese has long been considered a valuable product, whey has generally been viewed as a necessary by-product difficult in most cases to discard, although to some limited extent whey and especially the dried solids thereof (which constitute about 10 percent of the whey bulk) have been used, for example, as a high grade animal food. Further, a more significant use for whey was discovered heretofore, and it consists of converting whey into a whey wine or alcoholic beverage, as disclosed in my issued U.S. Pat. No. 2,449,064. The whey wine thus produced has a pleasant taste and bouquet, and a mild smoothness; and at the same time it contains no fusel oil, tannic acid or similar ingredients that are disagreeable and invariably present in conventional alcoholic beverages made from grain and fruit.

Recapitulating, the state of the art as concerns making of cheese and production of wine from the usually unwanted whey necessarily resulting from the cheese making process constitutes collecting milk (either whole or separated) in containers, and then forming cheese from the milk by the usual rennet process. Thereafter, and as a separate or independent process, the whey by product of the cheese making process is converted into whey wine. In such separate wine-making process as disclosed in my aforesaid prior patent, the repetitive periodic removal of solids from the wine-making vats is asserted to be a beneficial requirement for clarifying the beverage and for reducing the heat generated by the reactions characterizing the process.

I have now discovered that the previously separate and unrelated processes of first making cheese and of then making whey wine can be avoided, and that cheese and wine making can be performed concurrently in the same vat or container by a fermentation process not requiring the use of rennet or other comparable curdling agent. Moreover, the cheese (perhaps more accurately identified as a cheese-like product, usually referred to hereinafter as "milk-wine cheese," because curdling of the milk solids does not occur in the usual sense) thus produced is an entirely new product having flavors, textures, and bouquets that are most pleasing and seem to be derived either from the milk wine or from the factors that determine the flavors and bouquets thereof. The milk-wine cheese formed during the process is divisible into two distinct components produced concurrently but in different parts of the container and subsequently brought together to form the entire mass of milk-wine cheese. For identification, the three products (considering the cheese mass to be subdivided into its two componnts) formed by this noew process may be respectively denominated "milk-wine top cheese" or "top solids," "milk-wine," and "milk-wine bottom cheese" or "lower solids" (also conveniently referred to as "milk-wine residuum"). It should be noted that the milk-wine bottom cheese or residuum has a variety of utilities other than as a part of the entire cheese mass including use thereof as a base for perfumes and cosmetics.

As previously stated, the new process does not require the use of rennet, but is strictly a fermentation process that may be carried to completion either as a batch-type or as a continuous operation. Interestingly, in this process, the cheese solids do not develop throughout the entire body or mass of liquid milk at about the same time as do cheese curds in a rennet process for making cheese. Instead, the larger and greater bulk of the solids tend to rise and collect at the top of the liquid body, thereby permitting them either to be removed in one cake or to be retained in the vat throughout the entire process. The smaller and lesser bulk of the solids form in the bottom portion of the vat below the level of the milk wine, and although they can be separately collected, they may be brought together with the top solids upon removal of the intervening body of milk wine separating the same.

Retention of the milk-wine top cheese throughout at least a substantial portion (for example, the first forty to fifty days) of the entire process is beneficial in a number of respects, one of which is that the unusually pleasing flavors and bouquets of the milk wine concurrently being formed in the container are confined therein and permeate the top cheese to impart the same desirable flavors, aromas and bouquets thereto. Another benefit is that the top cheese forms a cover over the milk wine developing in the vat, thereby further protecting the fermenting liquors from acidity otherwise occurring as a consequence of exposure thereof to air.

Not only are milk-wine top cheese, milk wine, and milk-wine residuum new, desirable and beneficial end products of the milk fermentation process, but the process itself is a significant advance in the art because it enables huge production at low cost by reducing the time, equipment and labor heretofore required to make cheese, and also because it yields a greater mass of cheese from the same quantity of milk product. Furthermore, the cheese product formed by my fermentation process need not be brine cured (although it may be cured, aged and otherwise treated in any conventional manner) because the formation and presence of milk wine in the same vat during the entire process imparts a wine curing to the cheese solids and results in an essentially salt free cheese product of exceptionally mellow taste. Further, the cheese product is also essentially sugar free because the natural milk sugars present in conventional cheeses are removed from the cheese mass in the process and contribute to the proof spirits of the milk wine by being converted into alcohol (usually in about 38 days).

Removal of the cheese solids whether during the process or after completion thereof is facilitated by the unusual tendency of the solids to shrink or draw together into a relatively tight mass, thereby loosening the solids from the side walls of the fermentation vat which is opposite to the tendency of cheese curds to adhere to the vat walls in a conventional curdling process.

The milk wine and milk-wine cheese produced in accordance with the novel process can also be aged concurrently with their formation by adding appropriate quantities of very aged milk-wine residuum to the fermenting mass. Concurrent aging and production of milk-wine cheese obviates the requirement inherent in making conventional curd cheese of sorting the same after its formation for long periods under carefully controlled conditions for aging purposes.

Generally illustrative of the novel process is the following:

A culture constituting approximately 100 gallons of a fermenting milk-wine mass having an age of about 15 to 30 days is poured into a tank having a capacity of 3,000 gallons. Separated fresh whole milk is added until about 2,000 gallons thereof has been delivered into the tank. Also added to the tank at proper intervals is sugar in the amounts of about two pounds per gallon of milk. Care should be taken not to overfeed the mass with sugar, and it is usually best to add the sugar in proportion to increases in the quantity of the milk mass. Cane sugar is most desirable since it appears to have a finite fermentation action not characteristic of beet sugar. On about the fourth or fifth day of fermentation approximately 100 gallons of very aged (one or more years, for example) milk-wine residuum are added for the purpose of aging both the milk-wine cheese and milk wine as they are being produced.

The process is essentially self-sustaining and is carried to completion in approximately 111 days with substantially no attention. Before being covered and consequently concealed by milk solids, the fermenting mass is observed to be in motion and comprises one small eddy and one much larger indepenent (of the order of six times) eddy that are each swirling in a counterclockwise direction. As the process continues it becomes audible—the mass groaning perceptibly. After about 38 days the formation of milk sugar occurs appearing at the bottom of the tank in particulate form with each particle having the general appearance of a flattened navy bean. On about the 47th day the milk sugar disappears, apparently being converted into alcohol because during this period the alcoholic content of the forming milk wine has been observed to increase by as much as seven percent.

By the 55th day of fermentation, the temperature of the mass runs to the order of 150° F., and the mass puffs or swells and substantially fills the tank which previously had been only about two-thirds full. At this time, the material has a brownish-yellow color, is of a viscous sticky consistency, appears to have a crystalline structure, and is bitter of taste. In general, this period may be characterized as the picric state.

Saponification of the mass commences on about the 64th day of fermentation, and as it continues the mass becomes increasingly more bitter and is in a glossy turbulent state characterized by soap-like slipperiness with milky bubbles resembling soap bubbles. This action continues at a high pitch for about eight days when it suddenly terminates on the 72d day of fermentation with a great implosion. The process continues for approximately 40 more days during which the order stratification of the products is completed and, thereafter, substantially no further changes occur with additional retention of the products in the tank.

The product stratification within the tank comprises milk-wine top cheese which is concentrated at the upper portion of the mass, milk-wine bottom cheese or residuum which is concentrated at the bottom portion of the mass, and milk-wine which is located intermediate the top and bottom cheeses and separates the same. The milk-wine cheese and milk wine products are non-perishable and are susceptible of being stored for exceedingly long periods, if not indefinitely, although the starting material is very perishable milk. The top and bottom cheeses can be used separately, brought together and mixed into an homogeneous body. or mixed one with the other in any desired proportions. The milk-wine cheese products differ both in quantity and character from ordinary curd cheese prepared from an equal volume of milk, and it is believed to retain a greater quantity of the vitamins present in the original milk product, first by not heating the milk which drives off or destroys vitamins, and second by minimizing salt content and obviating salt curing since the presence of salt often leaches vitamins from a host material.

The milk wine product can be made to have various alcoholic contents and may vary from as little as 10% by volume to as much as 69% by volume. Generally, the percentage of alcohol (or its equivalent, the proof spirits) in the milk wine can be controlled and changed by varying the quantity of sugar added to the fermentation mass for each gallon of milk delivered to the fermentation tank. Further, the alcoholic content of the milk wine may be increased by removing water therefrom in a frost extraction process in which water in the form of ice is separated from the milk wine, as explained in my aforementioned Pat. No. 2,449,064.

By way of example and for purposes of indicating an order of magnitude relationship of the milk-wine cheese and milk wine products to the quantity of the milk mass constituting the starting material, the following information may be considered. From any quantity of milk constituting the starting material for the fermentation process, approximately 80% of such material is converted into milk wine and substantially all of the remaining 20% of the milk material is converted into milk-wine cheese. Thus, in the preceding example in which the quantity of milk aggregated 2,000 gallons, about 1,600 gallons of milk wine and of the order of 3,000 pounds of milk-wine cheese will be produced (assuming the milk used to weigh approximately 8 pounds per gallon, and neglecting the weight of the culture, very aged residuum, and sugar added to the tank). The total quantity of the milk-wine cheese produced is divided such that somewhat over ½ thereof is milk-wine top cheese or top solids and somewhat less than ½ is milk-wine bottom cheese or bottom solids, and in certain specific instances the ratio thereof is about 10 to 9 or 10/19 to 9/19.

Most advantageously, where cows are milked in the milking parlor the milk flows into the separator and directly therefrom into the fermentation tank, no pasteurization or cooling tanks being empolyed. Although as stated, separated fresh milk is the most preferred starting material, fresh whole milk can be used (to produce a milk-wine top cheese) in which case it is even more desirable to introduce it directly into the fermentation tank without cooling or retention, because once cream has arisen on milk the two cannot be reunited as in their natural intimate state. It is also possible to use dried milk after reconstituting the same into liquid form, thus demonstrating that the great values are also present in the dried milk solids.

As indicated hereinbefore, the culture used to initiate fermentation is a quantity of a fermenting milk-wine mass taken from a prior or already fermented mass and having an age of about 15 to 30 days. However, if a culture of this type is not available, a substitute therefor may be used such as yeast cultures of cane sugar and milk or whey (see my previous Pat. No. 2,449,664).

Also cane sugar is much preferred over any other form of sugar because of the finite fermentation process characterizing the same, as heretofore explained. Nevertheless, other sugers can be used including honey or the sugars produced by the honey bee, but the fermentation process does not then appear finite.

The fermentation tank or container used for the process is covered for the purpose of excluding air (principally oxygen) and light, and since considerable quantities of carbon dioxide are evolved during the process, they must be permitted to escape which can be accomplished in a variety of ways as, for example, by venting the tank through a water trap. Since tanks of this type are old and well-known as are the vents therefor, no further description will be set forth.

All or portions of the milk-wine top cheese or top solids may be removed from the fermenting mass as they are formed, or at any other time either during the process and before completion thereof or after completion, although early removal of the top solids prior to completion is not the preferred technique. The milk-wine top cheese or top solids tend to become a flexible flabby integer in about 3 or 4 days after the process commences, and such body or portions thereof are readily removed especially because they tend to shrink somewhat from the side walls of the container and free themselves therefrom. If removed and not immediately used as a green or uncured milk-wine cheese, the removed top solids may be aged in a separate container by forming holes or bores in the mass and covering the same with milk wine which works thereon to continue the aging. Evidently, the holes or bores formed in the body are filled with the liquid milk wine and facilitate permeation of the body therewith. Alternatively, the cake of top solids may be weighted or otherwise forced downwardly to the bottom of the tank during the process, say at about 50 days, displacing the bottom solids as the lower stratum and being perfected to an even greater extent by more complete permeation with the fermenting milk wine. This leaves the surface of the fermenting mass available for formation thereon of free-oil and milkwax which provide a substantially air tight seal for the mass that is not removed until completion of the process in about 111 days.

The process especially lends itself to a continuous or line-type operation as well as to the batch type procedure heretofore described in terms of a finite process in the typifying example using a fixed or determinate quantity of milk. In a continuous or line process, one or more tanks can be used preferably with the tanks at different stages in the fermentation process. Milk as it is produced would then be added to whichever tank is most appropriate. As any one tank reaches capacity and approaches the end of the fermentation process, portions of the milk wine, milk-wine top solids, and/or milk-wine bottom solids can be removed to reduce the quantity of material within the tank, thereby providing space for additional quantities of milk and the other ingredients to be added. It will be appreciated that stratification of the various products facilitates selective removal thereof from the fermentation tank which may be provided with controlled outlets at appropriate elevations to permit selective and controlled withdrawal of the materials defining the various strata.

As explained hereinbefore, since the milk can be used directly without first being cooled in retention tanks, and/or without first being heated to pasteurize the same, the requirement for equipment is considerably reduced, as is the requirement for personnel to attend any such handling and recycling of the milk product. Considering the operation of a single tank, since fermenting liquors are used as a culture, they are ever present in such tank as long as the process has not been carried to completion. Ideally, as the cows are milked the milk is immediately separated and delivered to the fermentation tank with substantially all of its natural heat still present which facilitates fermentation thereof. Depending upon the number of cows available, it may take several days before the tank is filled to the desired capacity. With each quantity of milk fed into the tank, sugar is included, as heretofore explained. The very aged residuum is added to the tank early in the process, as previously indicated, to confer its aging benefits to the fermenting milk wine and milk-wine cheese.

Upon completion of the fermentation process, the various products are removed from the tank to prepare the same for another operational cycle. Advantageously, several fermentation tanks are available so that when one is filled, the milk production can be delivered directly into another tank, or tanks, without the requirement of retention for long periods. It will be appreciated that the necessary culture to initiate fermentation in any one tank may be taken from another tank in which fermentation is already in process; the preferred age of such culture being about 15 to 30 days although this age is not critical.

The milk-wine bottom cheese or residuum is softer and finer in texture than the milk-wine top cheese and can be used directly, for example, as a pudding, custard, dressing and gourmet spread, and may also be used as a base for ice creams and candies. It has a natural fragrance which makes it excel as a base for lotions, perfumes, toilet soaps, etc., and also seems to cause clothing to be washed more cleanly if used as a base for laundry soaps. When used as a food product, both the residuum and top cheese seems to serve as a system lubricant in contradistinction to ordinary curd cheese which is known to have the opposite effect. Thus, the residuum is characterized by being both an internal and an external lubricant—soaps being a type of lubricant.

The products may be characterized as Nature's Formula inseparated fresh milk fermented with cane sugar and culture, very aged residua added, aged cured in the same tank, ready for use in one hundred and eleven days is 10/19 Milk-Wine Top Solids enjoined with 9/19 Milk-Wine Residua (lower solids) blasted from milk wine mass on the eighth day of saponification, seventy-second day of fermentation; the entire Milk-Wine Top Solids, Milk Wine, Milk-Wine Residua remain alive, Nature's Panacea, positively healthful assimilated marvelous matter and form far beyond milk digestion of any animal, never in other food and drink (save the approximation thereto explained in U.S. Pat. No. 2,449,064); each drop of mammal milk (man) is in fact Master Replica of God's total creation, by sugar fermentation 72 days became alive forever, manifesting the basic nature of man afore-designed unto life without end.

Analogously, the process may be characterized as a method of fermenting separated fresh milk with cane sugar and culture, add very aged residua, age cure in the same tank, ready for use in one hundred and eleven days; Nature's Formula: enjoin 10/19 Milk-Wine Top Solids with 9/19 of Milk-Wine Residua (lower solids) blast from milk wine mass on the eighth day of saponification, seventy-second day of fermentation; because the entire Milk-Wine Top Solids, Milk Wine, Milk-Wine Residua remain perfectly alive (not polluting whatsoever), positively healthful, assimulate into marvelous form and matter far beyond milk digestion of any animal, unknown in other food and drink (save the approximation thereto explained in U.S. Pat. No. 2,449,064); each drop of mammal milk (man) is in fact Master Replica of God's total creation, by sugar fermentation 72 days it becomes alive forever, manifesting the basic nature of man afore-designed unto life without end.

What is claimed is:

1. A method of making milk-wine cheese and milk wine concurrently within a common container, comprising the steps of: introducing a mixture consisting essentially of whole milk, sugar and a culture containing yeast into a common container to initiate fermentation of the milk mass therein; continuing fermentation of the milk mass for about 111 days until a tripartite stratification thereof occurs forming a substantial upper stratum of milk solids constituting edible milk-wine top cheese, an intermediate stratum of liquid constituting potable milk wine, and a lower stratum of milk solids constituting edible milk-wine bottom cheese; and removing the milk-wine top cheese, milk-wine bottom cheese and milk wine from such container, the latter of which is then adapted for use as an alcoholic beverage.

2. The method of claim 1 in which said intermediate milk wine stratum is removed from said container and then said upper and lower strata are removed therefrom after such removal of said intermediate milk wine stratum, whereby said milk-wine top cheese and milk-wine bottom cheese are combined within said container to form a unitary milk-wine cheese product.

3. The method of claim 1 including the further step of forcibly sinking said stratum of milk-wine top cheese toward the bottom portion of said container prior to termination of the process and removal of the various strata therefrom.

4. The method of claim 3 in which said fermentation is continued for at least 50 days, and in which said stratum of milk-wine top cheese is sunk on about the 50th day of the process and remains submerged until completion thereof.

5. The method of claim 1 comprising the further step of introducing into said container previously formed very aged milk-wine bottom cheese sufficient in quantity to influence the taste, body and bouquet of the presently formed milk wine and milk-wine cheese strata so as to effectively age the same concurrently with and as a part of the fermentation process.

6. The method of claim 5 in which the aforesaid quantities of milk and previously formed milk-wine bottom cheese are introduced into said container in ratios of the general order of 16 to 1.

7. The method of claim 1 in which said culture comprises a quantity of a well fermenting milk mass.

8. The method of claim 7 in which said quantity of well fermenting milk mass has an age in the range of about 15 to 30 days.

9. The method of claim 8 comprising the further step of introducing into said container previously formed very aged milk-wine bottom cheese sufficient in quantity to influence the taste, body and bouquet of the presently formed milk wine and milk-wine cheese strata so as to effectively age the same concurrently with and as a part of the fermentation process.

10. The method of claim 9 in which said quantity of milk, fermenting milk-mass culture and very aged milk-wine bottom cheese are respectively present in the ratio of about 2,000 gallons to 100 gallons, and in which about two pounds of sugar are added for each gallon of milk.

11. The method of claim 10 in which said quantity of milk and sugar are respectively separated fresh milk and cane sugar.

12. A milk-wine cheese product prepared by the process of claim 1.

References Cited

UNITED STATES PATENTS

| 2,449,064 | 9/1948 | Engel | 99—35 |
| 455,210 | 6/1891 | Hooker | 99—35 X |

OTHER REFERENCES

Whittier, et al., By Products from Milk. Reinhold Publ. Corp., N.Y., 1950 (pp. 23–25).

DAVID M. NAFF, Primary Examiner

U.S. Cl. X.R.

99—116